Oct. 29, 1940.   A. GIMM   2,219,989
PISTON
Filed July 13, 1937   2 Sheets-Sheet 1

Inventor:
Alfred Gimm
by Michaeli & Michaeli
attys.

Oct. 29, 1940.  A. GIMM  2,219,989
PISTON
Filed July 13, 1937  2 Sheets-Sheet 2

Inventor:
Alfred Gimm
by Michaelis & Michaelis
attys.

Patented Oct. 29, 1940

2,219,989

UNITED STATES PATENT OFFICE 2,219,989

PISTON

Alfred Gimm, Dessau-Ziebigk, Germany, assignor to Junkers Flugzeug - und - Motorenwerke Aktiengesellschaft, Dessau, Germany Application July 13, 1937, Serial No. 153,384
In Germany August 24, 1936

6 Claims. (Cl. 309—9)

My invention relates to engine pistons and more especially to the pistons of internal combustion engines. It is an object of my invention to provide a piston particularly usable in internal combustion engines of the high speed Diesel type, and less subject to wear than the pistons hitherto designed.

The high heat stresses acting, besides high mechanical stresses, on the pistons of internal combustion engines and more especially on the head surface of the piston body facing the combustion chamber are responsible for a considerably rapid wear of this part of the piston which is exposed to the direct action of the combustion gases and is therefore heated to higher temperatures than the piston body proper sliding in contact with the cooled cylinder liner. Such an increase of temperature is likely to impair the strength of the light metal pistons which are nowadays widely used in high speed engines, since the strength of light metals and light metal alloys is greatly reduced at high temperatures.

In order to protect the light metal against undue heat stresses and at the same time to reduce the abduction of heat from the combustion chamber, one has already suggested to insert in the head of light metal pistons a plate made of a heavy metal of lower heat conductivity, and to so connect this plate with the piston body, for instance by casting, that the plate contacts with the body over a large surface. While this construction is adapted to shield the light metal parts against the highest temperatures, and also limits the heat energy transferred onto the piston by the combustion gases, there still arises the danger that the light metal in contact with the piston plate is heated unduly. The rigid connection of the protective heavy metal plate with the piston body further requires the entire piston to be exchanged whenever the plate should become worn.

It has also been suggested to connect to the piston a plane plate of substantially uniform thickness by means of screws or other removable connecting members, this plate being so shaped as to contact with the piston only over a small surface. Experience has however shown that under the action of the heat arising in the operation of the piston such a plate tends to be deformed in an irregular manner and to therefore soon become useless.

In the piston according to this invention the surface plate mounted on the piston is designed to be less subject to deformation and wear. This is because the protective plate is made to contact with the piston body only over a marginal zone, and has a dome-shaped central portion, the apex of which faces the combustion chamber and the wall thickness of which is much thinner than the relatively thick marginal or peripheral portion of the plate. If a plate of this description is heated, it will be deformed in such manner as to be curved in the direction towards the combustion chamber, being at the same time lifted partly off its seat on the piston body, so that the surface of contact between the plate and the piston body is further diminished and the heat transmission further reduced.

In the drawings affixed to this specification and forming part thereof several forms of a piston embodying my invention are illustrated diagrammatically by way of example. In the different figures similar parts are marked by the same reference numerals.

In the drawings

Fig. 1 is an axial sectional view of the first form of a light metal piston in combination with a surface plate according to this invention while

Figure 6:
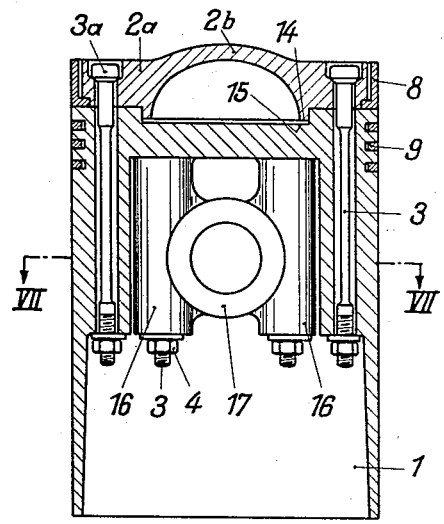
Fig. 6 is an axial sectional view of a modified form.
Figure 7:
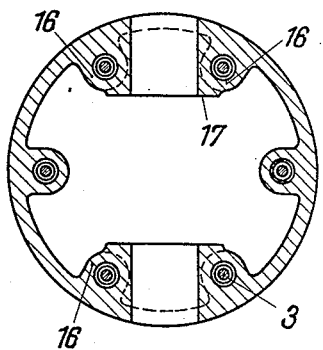

Fig. 7 being a cross section on the line VII—VII in Fig. 6.

Referring to the drawings and first to Figs. 1–5, 1 is the piston body, 9 are the packing rings mounted in grooves of the body, and 2 is the heavy metal plate. 2a is the plane marginal portion resting on the bottom 1a of the piston body, and 2b is the central dome-shaped portion, the apex of which faces the combustion chamber. The plane marginal portion 2a of the bottom plate is so shaped as to hold the packing ring 8 adjacent to the combustion chamber, which may be a closed ring according to German Patent 565,853, down on the piston body. To this end the surface plate is formed with an undercut groove 12, into which the horizontal flange of the piston ring 8 projects. Owing to the favorable mechanical properties resulting from its dome shape, the central part 2b of the bottom plate may be considerably thinner than the plane marginal part.

The surface plate 2 is held on the piston body 1 by means of screw bolts 3, the heads 3a of which abut against the bottom of cavities formed in the plane marginal portion of the plate, while the inner ends abut by means of nuts 4 against ribs 5 formed in the piston body. These ribs extend down to the bottom of the piston, so that the otherwise thin-walled piston body is relieved of the forces required for holding the bottom plate down on the piston.

In a piston designed in the manner here described the heat transferred from the combustion gases onto the surface plate, in travelling towards the piston body, is offered an increased resistance, partly in view of the longer heat path and partly owing to the narrowing down of the heat conductive cross sections. There thus results at this point a considerable drop of temperature, in consequence of which the temperature, to which the piston body is heated in the operation of the engine, is considerably lower than the temperature of the surface plate.

Figure 1:
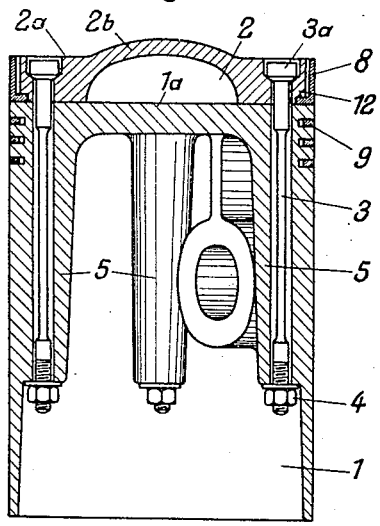
Figure 2:
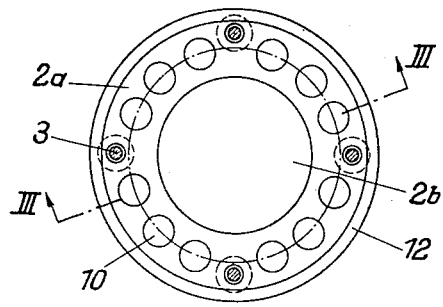
Fig. 2 is a plan view of the surface plate separated from the piston body.
Figure 3:
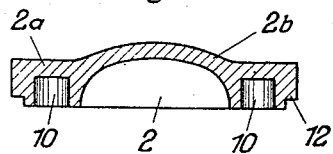
Fig. 3 is a cross sectional view on the line III—III in Fig. 2.

I have found it particularly useful to further reduce the contact surface between the surface plate 2 and the piston body 1, and thereby also the heat conductive cross sections, by means of cavities 10 formed, in the modification illustrated in Figs. 2 and 3, in the marginal portion of the surface plate. I might however also arrange these cavities in the piston body 1.

Figure 4:
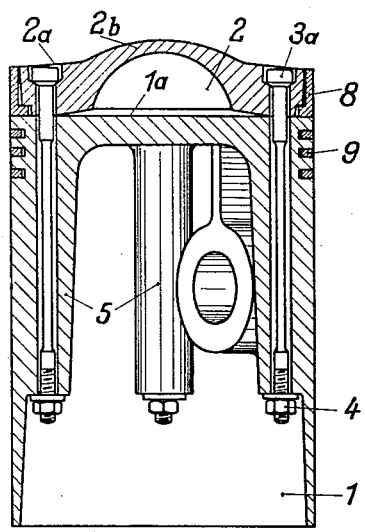
Fig. 4 is a sectional view similar to Fig. 1, but illustrating on a greatly exaggerated scale, the change of form to which the bottom plate is subjected in consequence of the heat.
Figure 5:
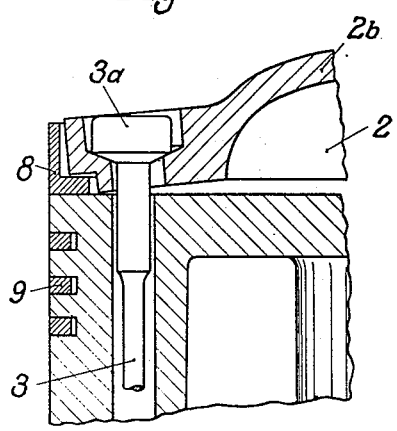
Fig. 5 is a similar view, drawn to a larger scale, of the lefthand top portion of Fig. 4.

When the surface plate becomes heated during operation it deforms as illustrated, in a greatly exaggerated manner, in Figs. 4 and 5, and is partly lifted free of its seat, theoretically contacting with the piston body only in a circular line, whereby a particularly effective protection of the piston body against undue heating is obtained.

Fig. 5 also illustrates on a larger scale the manner in which the piston plate is held down on the piston body. The contacting surfaces of the heads 3a of the screw bolts and of the surface plate have the form of spherical surfaces, whereby the screw bolts are prevented from being subjected to bending stresses. Preferably the connecting members have a higher elasticity than present in the usual short screw bolts. Bolts of considerable length having the greater part thereof of a cross section not greater and, if possible, even smaller than that of the threaded end portion are desirable.

In the modified form of piston shown in Figs. 6 and 7 the surface plate is formed, on the side facing the piston body 1, with an annular central extension 14 fitting into a corresponding circular depression 15 of the piston body, whereby the surface plate is held against radial displacement relative to the piston body.

Furthermore in this modification the ribs 16 which are traversed by the screw bolts, flank a gudgeon pin bearing, and are so combined into a unitary structure with this bearing that together with the bolts extending through them, they reinforce the bearing against to the breaking of this part of the piston.

I wish it to be understood that I do not desire to be limited to the exact details of construction shown and described for obvious modifications will occur to a person skilled in the art.

I claim:

1. A piston for use in high speed Diesel engines comprising a body portion of lightweight metal having a relatively high heat conductivity, and a protecting plate of heavy metal having a relatively low heat conductivity, said plate member having a marginal portion with a plane surface engaging a corresponding surface on said body, and having a dome-shaped central portion of a vertical thickness materially less than either the horizontal or vertical thickness of said marginal portion and the concave side of which is directed toward said body whereby said central portion will deform away from said body when heated, and means for securing said marginal portion to said body.

2. A piston as in claim 1, said marginal portion having plane top and bottom surfaces, and having a plurality of bores extending inwardly from said bottom surface whereby the contact area between said bottom surface and the top of said body is reduced.

3. A piston as in claim 1, said securing means comprising bolts having heads seated in sockets in said marginal portion, and ends fastened to said piston body whereby the inner edge of said marginal portion can lift from the top of said body when said plate is deformed by heat, while at least the outer edge of said marginal portion maintains engagement with the top of said body.

4. A piston as in claim 1, said fastening means comprising bolts having heads seated in sockets in said marginal portion, said bolts having stems of reduced cross-section and of a sufficient length to effect a resilient connection between said piston body and said plate, and means securing the ends of said bolts to said body.

5. A piston as in claim 1, said piston having a top flat marginal surface and a recessed center portion, and a flange depending from the inner periphery of said plate marginal portion, said flange being adapted to be centered in said recessed portion.

6. A piston as in claim 1, a plurality of ribs within said body, gudgeon pin bearings flanked by said ribs, and said securing means comprising bolts having their opposite ends fastened, respectively, to said marginal plate portion and said ribs.

ALFRED GIMM.